(12) United States Patent
Fukunaga et al.

(10) Patent No.: US 7,401,688 B2
(45) Date of Patent: Jul. 22, 2008

(54) TORQUE CONVERTER

(75) Inventors: Takao Fukunaga, Yawata (JP);
Tomohiro Tasaka, Kawanishi (JP)

(73) Assignee: Exedy Corporation, Osaka (JP)

( * ) Notice: Subject to any disclaimer, the term of this patent is extended or adjusted under 35 U.S.C. 154(b) by 379 days.

(21) Appl. No.: 11/358,006

(22) Filed: Feb. 22, 2006

(65) Prior Publication Data

US 2006/0185955 A1    Aug. 24, 2006

(30) Foreign Application Priority Data

Feb. 24, 2005    (JP) .............................. 2005-049266

(51) Int. Cl.
*F16H 45/02* (2006.01)
(52) U.S. Cl. ....................... 192/3.29; 60/338
(58) Field of Classification Search .............. 192/3.29; 60/338, 345, 361, 362, 364–367
See application file for complete search history.

(56) References Cited

U.S. PATENT DOCUMENTS 4,129,000 A * 12/1978 Umeda et al. .................. 60/361

6,796,411 B2 * 9/2004 Bauer et al. ................. 192/3.29
2002/0056600 A1 * 5/2002 Fukunaga et al. .......... 192/3.29
2007/0240412 A1 * 10/2007 Marathe et al. ............... 60/330

FOREIGN PATENT DOCUMENTS

| JP | 3-10455 A | 1/1991 |
| JP | 2002-106676 A | 4/2002 |
| WO | WO 00/68598 A1 * | 11/2000 |

* cited by examiner

*Primary Examiner*—Richard M Lorence
(74) *Attorney, Agent, or Firm*—Global IP Counselors, LLP

(57) ABSTRACT

A torque converter 1 with a lock-up device 4 is provided to improve damping performance while suppressing an increase in the axial dimension. A torus 3 of the torque converter 1 includes an impeller 10, a turbine 11 and stator 12. The torus 3 has a shape such that a radial direction dimension is longer than an axial dimension thereof, and a longitudinal axis t1 is inclined away from a straight line P perpendicular to a rotational axis such that a radially outer portion of the longitudinal axis t1 is closer toward the engine than a radially inner portion thereof. The torsion springs 52 are located adjacent on the front cover side of a radially inner portion of the torus 3.

20 Claims, 2 Drawing Sheets

TORQUE CONVERTER

CROSS-REFERENCE TO RELATED APPLICATIONS

This application claims priority to Japanese Patent Application No. JP2005-49266. The entire disclosure of Japanese Patent Application No. JP2005-49266 is hereby incorporated herein by reference.

BACKGROUND OF THE INVENTION

1. Field of the Invention

The present invention generally relates to a torque converter. More specifically, the present invention relates to a torque converter having a lock-up device with an elastic member.

2. Background Information

A torque converter includes a torus having three types of vane wheels (an impeller, a turbine and a stator) and serves to transmit torque by a fluid in the torus. The impeller forms a fluid chamber filled with operating oil with the front cover. The impeller mainly includes an annular impeller shell, a plurality of impeller blades fixed to an inner surface of the impeller shell, and an annular impeller core fixed to the opposite ends of the impeller blades. The turbine is disposed in the interior of the fluid chamber opposite the impeller in the axial direction. The turbine mainly includes an annular turbine shell, a plurality of turbine blades fixed to a surface of the turbine shell facing the impeller, and an annular turbine core fixed to the opposite ends of the turbine blades. A radially inner portion of the turbine shell is fixed to a flange of a turbine hub by a plurality of rivets. The turbine hub is unrotatably connected to a main drive shaft of a transmission. The stator regulates the direction of the operating oil that is returned from the turbine to the impeller. The stator is disposed between radially inner portions of the impeller and the turbine. The stator mainly includes an annular stator shell, a plurality of stator blades formed on an outer circumference of the stator shell, and an annular stator core formed on the opposite ends of the stator blades. The stator is supported by a stator shaft via a one-way clutch.

One of coefficients expressing performance of the torque converter is capacity coefficient C, which is given by a formula (1) as shown below.

$$C = TI/nI^2 \quad (1)$$

Capacity coefficient C is a coefficient showing a relationship between nI and TI, wherein nI is the number of revolutions of the input shaft of the torque converter and TI is a torque input to the input shaft of the torque converter. Capacity coefficient C represents a torque that can be input at a certain number of revolutions. As understood from the aforementioned formula, the larger the capacity coefficient C of the torque converter is, even if the number of revolutions nI of the input shaft of the torque converter, i.e., the number of revolutions of the engine, remains the same, the larger torque TI that can be input to the torque converter is. This means that the larger the capacity coefficient C of the torque converter is, even if the number of revolutions nI of the input shaft of the torque converter remains the same, the larger the load to the engine is. In a range where the speed ratio, which is a ratio at a rotation speed of the turbine relative to a rotation speed of the impeller, is small, i.e., in an idling range of the engine and a range close to the idling range, the capacity coefficient C is large. Further, as the speed ratio increases, i.e., as the number of revolutions of the engine rises, the capacity coefficient C decreases.

If the capacity coefficient C at a high speed ratio is improved in the torque converter, an acceleration performance during an intermediate acceleration of a vehicle is improved. Therefore, it is a common practice to increase the capacity coefficient C in a high speed ratio range, as shown in Unexamined Japanese Patent Publication JP2002-106676.

The lock-up device is disposed in a space between the turbine and the front cover. The lock-up device is adapted to couple mechanically the front cover to the turbine to transmit directly torque from the front cover to the turbine. The lock-up device includes a disc-like piston to be pressed against the front cover, a retaining plate fixed to a radially outer portion of the piston, torsion springs supported by the retaining plate in the rotational direction and radially outward, and a driven plate supporting both the ends of the torsion springs in the rotational direction, with the driven plate being fixed to a turbine shell or the like of the turbine.

When the lock-up device is engaged, torque is transmitted from the front cover to the piston, and then to the turbine via the torsion springs. Further, when torsional vibration is input to the lock-up device, the torsion springs are compressed between the retaining plate and the driven member in the rotational direction to absorb and attenuate the torsional vibration. An example of this structure can be found in Unexamined Japanese Patent Publication H03-10455.

In recent years, lock-up devices employing a multi-plate clutch having a plurality of friction surfaces to address an increase in the engine torque have been used. There is a known torque converter in which torque is transmitted by fluid only when a vehicle starts, and the lock-up device is connected at a speed of 10 km per hour or greater, for example. In such a structure in which a lock-up region is expanded, improved performance of the torsion spring is desired to absorb and damp torsional vibrations sufficiently in response to torque changes from the engine.

As described before, it is necessary to enlarge the axial dimension of the lock-up device to realize a multi-plate structure or to improve the performance of the torsion springs. However, since the torsion springs are disposed axially between the front cover and the turbine, the size of the entire torque converter increases if the torsion spring size is increased.

In view of the above, it will be apparent to those skilled in the art from this disclosure that there exists a need for an improved a torque converter. This invention addresses this need in the art as well as other needs, which will become apparent to those skilled in the art from this disclosure.

SUMMARY OF THE INVENTION

It is an object of the present invention to improve a damping performance, while suppressing an increase of in the axial dimension of a torque converter provided with a lock-up device.

A torque converter according to a first aspect of the present invention transmits torque from an engine to an input shaft of the transmission and has a front cover, an impeller, a turbine, a stator, a lock-up device, and a torus. Torque from the engine is input to the front cover. The impeller defines a fluid chamber with the front cover. The turbine is located within the fluid chamber opposing the impeller. The stator is located between a radially inner portion of the impeller and a radially inner portion of the turbine to adjust a fluid flowing from the turbine to the impeller. The lock-up device mechanically transmits torque from the front cover to the input shaft and includes an elastic member. The torus is constituted by the impeller, the turbine, and the stator. The torus has a shape such that a radial dimension is longer than an axial dimension thereof, and the longitudinal axis thereof is inclined away from a straight line perpendicular to a rotational axis such that a radially outer portion of the longitudinal axis is nearer to the engine than a radially inner portion thereof. The elastic member is located adjacent on the front cover side of a radially inner portion of the torus.

In the torque converter, the torus is inclined so that a space is ensured adjacent the radially inner portion of the torus. As a result, the elastic member is so enlarged to attain easily low stiffness without increasing the size of the entire torque converter.

According to a torque converter according to a second aspect of the present invention is the torque converter of the first aspect, wherein an inclined angle θ1 between the straight line and a line perpendicular to a line segment that realizes the shortest width of the radially inner portion of the torus is within a range between 15 and 40 degrees.

In the torque converter, the elastic member is sufficiently enlarged to realize easily its low stiffness because θ1 is 15 degrees or more. In addition, flow passage areas of the stator and the impeller are sufficiently enlarged so that the performance of the torque converter is improved because θ1 is 40 degrees or below.

A torque converter according to a third aspect of the present invention is the torque converter of the first or second aspect, wherein blades of the stator extend along the longitudinal axis.

A torque converter according to a fourth aspect of the present invention is the torque converter of any one of the first to third aspect, wherein a surface of the blade of the stator facing the turbine is inclined away from the straight line such that a radially outer portion of the surface is nearer to the engine than a radially inner portion thereof.

A torque converter according to a fifth aspect of the present invention is the torque converter of the second aspect, wherein blades of the stator extend along the longitudinal axis. A surface of the blade of the stator facing the turbine is inclined away from the straight line such that a radially outer portion of the surface is nearer to the engine than a radially inner portion thereof. The surface of the blade of the stator facing the turbine is straight in a cross sectional view. An angle θ2 between the surface facing the turbine and the line segment is more than or equal to 5 degrees, wherein θ1−15 degrees<θ2<θ1+10 degrees In the torque converter, angle θ2 satisfies the above conditions so that an axial thrust of the stator is maintained and the torque ratio is enlarged.

A torque converter according to a sixth aspect of the present invention is the torque converter of the fourth or fifth aspect, wherein the surface of the blade of the stator facing the impeller is composed of more than or equal to two line segments or flat surfaces that are contiguous and joined by a line segment, or a curved line convex to the impeller.

In the torque converter, the surface of the blade of the stator facing the impeller has the aforementioned shape so that an axial thrust of the stator is maintained and the torque ratio is enlarged.

A torque converter according to a seventh aspect of the present invention is the torque converter of any one of the first to sixth aspects, wherein a distance R1 between the most radially inner edge of the blade of the impeller and the center of the torque converter is shorter than distance R2 between the most radially inner edge of the blade of the turbine and the center of the torque converter.

In the torque converter, the inlet radius ratio of the impeller is decreased so that the capacity is kept high.

In a torque converter according to the present invention, the torus is inclined so that the elastic member is enlarged to attain easily low stiffness without increasing the size of the entire torque converter.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(1) Structure

Figure 1:
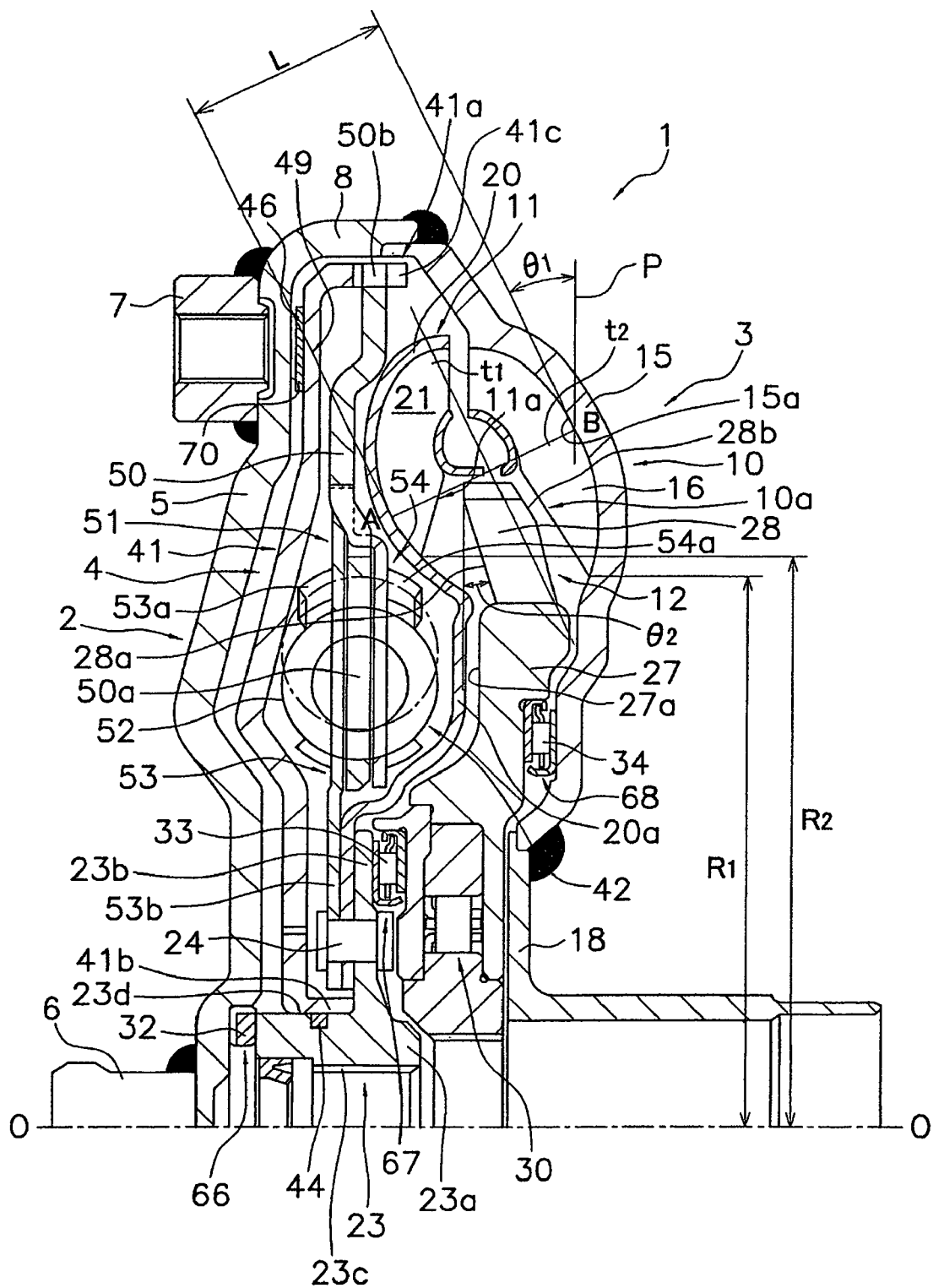
FIG. 1 is a schematic, cross-sectional view of a torque converter according to a preferred embodiment of the present invention.

FIG. 1 shows a torque converter 1 according to a preferred embodiment of the present invention. In FIG. 1, the torque converter 1 mainly includes a front cover 2, a torus fluid operating chamber 3 composed of three kinds of vane wheels (an impeller 10, a turbine 11, and a stator 12) located concentric with the front cover 2, and a lock-up device 4 located within an axial space between the front cover 2 and the turbine 11. The front cover 2 and impeller shell 15 of the impeller 10 are welded at their radially outer portions, thereby defining a fluid chamber filled with operating oil or fluid.

The front cover 2 is a member to which torque is input from a crankshaft of the engine (not shown). The front cover 2 is mainly composed of a disc-like main body 5. A center boss 6 is fixed to the center of the main body 5. A plurality of nuts 7 is fixed on the engine side of the radially outer portion of the main body 5. A tubular portion 8 is integrally formed at the radially outer end of the main body 5 extending toward the transmission in the axial direction.

An annular and flat friction surface 70 is formed inside and at the radially outer portion of main body 5 of the front cover 2. The friction surface 70 axially faces the transmission.

The fluid operating chamber or torus 3 is disposed on the transmission side in the axial direction in the fluid chamber. Thus, an inside part of the fluid chamber is partitioned into the fluid operating chamber 3 and a space formed between the main body 5 of the front cover 2 and the turbine 11.

The impeller 10 is formed of the impeller shell 15, a plurality of impeller blades 16 fixed to an inner surface of the impeller shell 15, and an impeller hub 18 fixed to a radially inner edge of the impeller shell 15. Each impeller blade 16 has a much smaller radial dimension than a conventional prior-art impeller blade and is fixed to an outer periphery-side portion of the impeller shell 15.

The turbine 11 is disposed to face the impeller 10 in the fluid chamber. The turbine 11 is formed of a turbine shell 20, a plurality of turbine blades 21 fixed to the turbine shell 20, and a turbine hub 23 fixed to an inner peripheral edge of the turbine shell 20.

Each turbine blade 21 has a much smaller radial dimension than a conventional prior-art turbine blade and is fixed to an outer periphery-side portion of the turbine shell 20. The turbine hub 23 has a cylindrical boss 23a and a flange 23b extending radially outward from the boss 23a. The flange 23b is fixed to a portion adjacent to an inner peripheral edge of the turbine shell 20 by a plurality of rivets 24. A spline 23c is formed on an inner peripheral surface of the boss 23a. A main drive shaft (not shown) extending from the transmission side is engaged with the spline 23c. As a result, torque from the turbine hub 23 is output to the transmission.

The stator 12 is disposed between an inner peripheral portion of the impeller 10 and an inner peripheral portion of the turbine 11. The stator 12 "straightens" operating oil returning from the turbine 11 to the impeller 10 to amplify torque in the torque converter 1. This torque amplifying operation can obtain superior accelerating performance when a vehicle starts. The stator 12 is formed of a stator carrier 27, and a plurality of stator blades 28 formed on an outer circumference of the stator carrier 27.

An inner periphery-side portion of a turbine-side surface 28a of the stator blade 28 is positioned closer to the transmission in the axial direction than an outer periphery-side portion thereof. In other words, the turbine-side surface 28a of the stator blade 28 has an inclined shape that tapers the fluid operating chamber 3. By the aforementioned construction, it is possible to obtain a space radially inward of the fluid operating chamber 3 and to use a damper mechanism 42, which will be described later, of greater size when compared to that of the prior art. An impeller-side surface 28b of the stator blade 28 also has an inclined shape similar to that of the surface 28a. As a result, the stator blade 28 has a substantially constant axial width. The stator blade 28 has much smaller radial and axial dimensions than a conventional prior-art stator blade.

The stator carrier 27 is supported by a stator shaft (not shown) through a one-way clutch 30. The stator carrier 27 extends by a longer distance in a radial direction than a conventional prior-art stator carrier and is shaped such that a face 27a of the stator carrier 27 on the axial engine side is substantially indented the length of the face. More specifically, a radially intermediate portion of the face 27a of the stator carrier 27 on the axial engine side is preferably closer to the transmission in the axial direction than the outer periphery-side portion and the inner periphery-side portion of the turbine-side face 28a of the stator blade 28. The radially intermediate portion of the face 27a of the stator carrier 27 is closer to the transmission in the axial direction than the axially intermediate position between the impeller outlet and the turbine inlet.

An inner periphery-side portion or a radially inner portion 20a (a portion to which each turbine blade 21 is not fixed) of the turbine shell 20 is preferably curved in the axial direction along the stator carrier 27. Further, the inner periphery-side portion 20a of the turbine shell 20 is closer to the transmission in the axial direction than the axially intermediate position between the impeller outlet and the turbine inlet. The inner periphery-side portion 20a of the turbine shell 20 is adjacent the intermediate position between the impeller outlet and the turbine inlet, i.e., sufficiently on the transmission side in the axial direction so that it is possible to reduce the axial size of radially inner portion of the torque converter 1. More specifically, the inner periphery-side portion 20a of the turbine shell 20 is positioned closer toward the impeller 10 than the intermediate position between the impeller outlet and the turbine inlet, i.e., sufficiently on the transmission side in the axial direction so that it is possible to reduce the axial size of radially inner portion of the torque converter 1. Since the recessed portion facing the axial engine side is formed by curving the stator carrier 27 and the turbine shell 20 toward the axial transmission side by large amounts as described above, the preferred space for the damper mechanism 42, which will be described later, can be obtained radially inward of the fluid operating chamber 3, and especially radially inward of a portion of the torus fluid operating chamber 3 corresponding to the turbine 11.

A washer 32 is disposed between the main body 5 of the front cover 2 and the turbine hub 23 in the axial direction. A plurality of grooves extending in a radial direction is formed on an end face of the washer 32 on the axial engine side. Through each groove, operating oil can flow between radial opposite sides of the first washer 32. A first port 66 is formed axially between the front cover 2 and the turbine hub 23 in order for the operating oil to be able to communicate radially. The first port 66 is provided to communicate the oil passage provided in the main drive shaft with the space between the front cover 2 and the piston 41.

A thrust bearing 33 is disposed between the flange 23b of the turbine hub 23 and the one-way clutch 30. Operating oil can flow between radial opposite sides of the thrust bearing 33. A second port 67 is formed in order for the operating oil to be communicable radially to both sides in the area between the turbine hub 23 and the radially inner portion of the stator 12, more specifically the one-way clutch 30. In other words, the second port 67 communicates the oil passage between the main drive shaft and the stator shaft with the fluid operating chamber 3.

Moreover, a thrust bearing 34 is provided in the axial direction between the stator carrier 27 and the radially inner portion of the impeller shell 15. Operating oil can flow between radial opposite sides of the thrust bearing 34. A third port 68 is formed axially between the stator 12 (more specifically the stator carrier 27) and the impeller 10 in order for the operating oil to be able to communicate radially to both sides. In other words, the third port 68 is provided to communicate the oil passage between the stator shaft and the impeller hub 18 with the fluid operating chamber 3.

Each oil passage is connected to a hydraulic circuit (not shown), and is capable of supplying and discharging the operating oil to and from the first through the third ports 66-68 independently.

The lock-up device 4 is located in an annular space between the main body 5 of the front cover 2 and the turbine 11 in an axial direction. The lock-up device 4 is provided to connect mechanically the front cover 2 and the turbine 11 in accordance with changes in the hydraulic pressure within the space. The lock-up device 4 has a piston function to be actuated voluntarily by the change in the hydraulic pressure in the space and a damper function of absorbing and damping torsional vibration in the rotating direction. The lock-up device 4 is mainly formed of a piston 41 and a damper mechanism 42.

The piston 41 is a circular disk-like member, and is disposed near the transmission side of the main body 5 of the front cover 2 in the axial direction. The radially outer portion of the piston 41 defines a fiction engagement part 49 on a side of the friction surface 70 of the front cover 2 toward the transmission in the axial direction. The fiction engagement part 49 is flat and annular. An annular friction facing 46 is fixed to the friction engagement part 49 on the friction surface 70 side. The piston 41 is provided at its radially outer edge with an outer cylindrical portion 41a extending axially toward the transmission, and the outer cylindrical portion 41a is provided with a plurality of slots 41c.

The piston 41 is provided at its radially inner edge with an inner cylindrical portion 41b extending axially toward the transmission. The inner circumference of the inner cylindrical portion 41b is supported by an outer peripheral surface 23d of the turbine hub 23 such that the piston 41 can move in the axial and rotational directions. The inner cylindrical portion 41b can axially move only to a predetermined position on the transmission side, in which an axial end on the transmission side of the inner cylindrical portion 41b comes into contact with the flange 23b of the turbine hub 23. A seal ring 44 is arranged in an annular groove formed on the outer peripheral surface 23d of the turbine hub 23 and is in contact with the inner circumferential surface of the inner cylindrical portion 41b to seal a radially inner edge of the piston 41 in the axial direction.

The damper mechanism 42 is a device to transmit torque from the piston 41 to the turbine 11, while absorbing and attenuating torsional vibrations. The damper mechanism 42 is mainly formed of a drive member 50, a driven member 51, and a plurality of torsion springs 52.

The drive member 50 is an annular disc-like member, and is arranged on the engine side of the piston 41 from a distance. The drive member 50 has a plurality of projections 50b at the radially outer end engaged with the slots 41c formed in the outer cylindrical portion 41a of the piston 41. The engagement allows the piston 41 and the drive member 50 to move relative to each other in the axial direction, but not to rotate together in the rotational direction. The drive member 50 is provided with window holes 50a penetrating in the axial and rotational directions to support the torsion springs 52. The driven member 51 is composed of a pair of a first plate member 53 on the engine side and a second plate member 54 on the transmission side, interposing the drive member 50 therebetween in the axial direction. The radially outer portions of plate members 53 and 54 are fixed together by a plurality of rivets not shown in figures. The plate members 53 and 54 are formed with a plurality of windows having window portions 53a and 54a that are cut and bent outward in the axial direction, respectively, corresponding to the window holes 50a. The radially inner portion 53b of the first plate member 53 extends radially inwardly over the second plate member 54 and is fixed to the flange 23b of the turbine hub 23 by the above-mentioned rivets 24.

The torsion spring 52 is disposed in the window hole 50a. The torsion spring 52 is preferably a coil spring extending in a rotating direction. End portions in the rotating direction of the torsion spring 52 are supported in the above-described window hole 50a and by the windows of the window portions 53a and 54a. Furthermore, axial movement of the torsion spring 52 is restricted by each window portion 53a and 54a of the driven member 51. The torsion spring 52 is disposed to correspond to the inner periphery-side portion 20a of the turbine shell 20. A portion of the torsion spring 52 is positioned in the recessed groove of the inner periphery-side portion 20a.

The torsion springs 52 are disposed radially inward of the fluid operating chamber 3. Specifically, the torsion springs 52 are positioned adjacent to the front cover side of the radially inner portion of the torus 3. More specifically, an axial edge on the transmission side of the torsion spring 52 is beyond the axial edge on the transmission side of the turbine blades 21 of the turbine 11 and is close to the axially intermediate position between the impeller outlet and the turbine inlet.

As a result, a coil diameter of the torsion spring 52 can be substantially increased compared with that of the prior art without increasing the axial dimension of the entire torque converter 1. Since a large coil diameter of the torsion spring 52 can be obtained as described above, it is easy to improve performance of the torsion spring 52 in torsional vibration damping by realizing a lower stiffness. As a result, it is possible to use fluid torque transmission by the torus 3 of the torque converter 1 only at the start of the vehicle and then to use the torque converter 1 in a mechanical torque transmission state in which the lock-up device 4 is connected.

(2) Features of the Torus

The fluid operating chamber or torus 3 is defined by the impeller 10, the turbine 11 and the stator 12. Flow passages of the torus 3 are spaces defined by the shell and core of each of the vane wheels.

In this embodiment, the torus 3 has a shape of generally ellipse in a cross section. The torus 3 has a shape having a radial dimension longer than an axial direction thereof. A longitudinal axis t1 of the torus 3, which is perpendicular to a line segment AB wherein a width of the radially inner portion passing through the center of the torus 3 is at minimum, is inclined away from a straight line P, which is perpendicular to the rotational axis O-O, such that the radially outer portion of the axis t1 is nearer toward the engine than the radially inner portion. In this torque converter 1, it is possible to ensure a space adjacent to the radially inner portion of the torus 3, thereby enlarging the torsion springs 52 to attain easily a low stiffness because the torus 3 is inclined. Note that the radially inner portion of the torus 3 is defined as inner portions constituted by the shell of each of the vane wheels.

The longitudinal axis t1 is parallel to a straight portion 15a formed in the inner surface of the impeller core 15. Inclined angle θ1 of the straight portion 15a relative to the straight line P is equal to or around 30 degrees. θ1 is preferably in a range between 15 to 40 degrees, and more preferably in a range between 25 to 35 degrees. In the torque converter 1, θ1 is equal to 15 degrees or more so that the torsion springs 52 are sufficiently enlarged to attain easily its low stiffness. In addition, θ1 is equal to 40 degrees or below so that the flow passage areas of the stator 12 and the impeller 10 are sufficiently enlarged to improve the torque converter performance.

Figure 2:
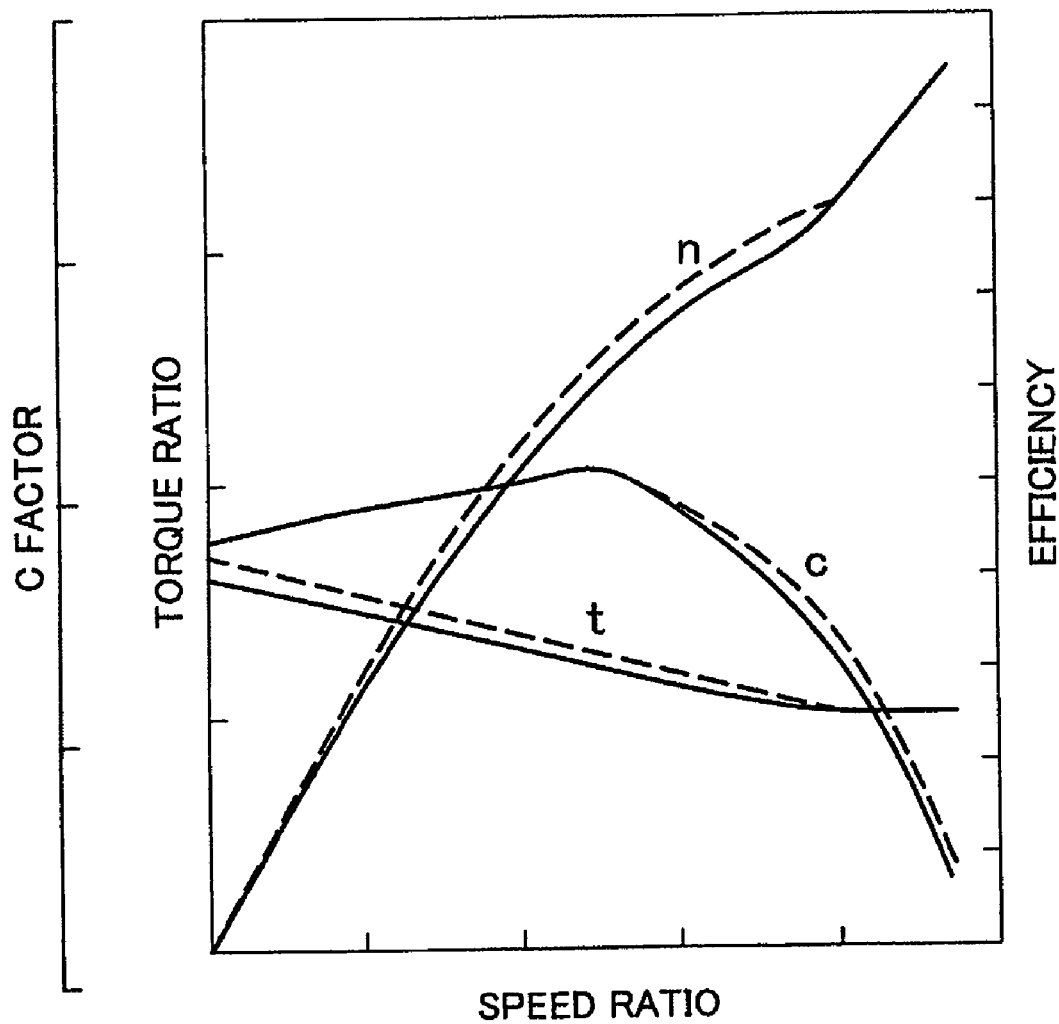
FIG. 2 is a view of a graph showing a comparison of torque converter performances between a torque converter according to the present invention and a reference example.

As mentioned before, it can be considered that the torque transmission performance by the fluid might be degraded if the torus is downsized. In the torque converter wherein the torque is transmitted by the fluid only at the start and the lock-up device is engaged at over 20 km/h, the degradation of the torque transmitting performance by the fluid does not cause a serious problem. Additionally, in the present invention, θ1 is preferably set to 40 degrees or below in order to compensate for the degradation of the performance. In FIG. 2, the performances of the torque converter between the torque converter according to the present invention and a torque converter wherein θ1 is over 40 degrees are compared. The torque converter according to the present invention is expressed in dashed lines, and the reference example is expressed in solid lines. As clear from the figure, in the torque converter according to the present invention, the capacity C is larger in a high speed ratio range. The reason is that torus area of the impeller is small in the case that θ1 is over 40 degrees. Moreover, in the torque converter according to the present invention, torque ratio t and efficiency n are larger over an entire range. The reason is that the torus area of the stator is small in the case that θ1 is over 40 degrees.

The stator blades 28 of the stator 12 extend along the longitudinal axis t1. Specifically, the turbine-side surface 28a of the stator blade 28 of the stator 12 is inclined away from the straight line P such that the radially outer portion of the turbine-side surface 28a is nearer toward the engine than the radially inner portion. The turbine-side surface 28a of the stator blades 28 of the stator 12 is linear in a cross sectional view. Angle θ2 between the straight line and the turbine-side surface 28a inclined away from the straight line is equal to or around 17 degrees. Preferably, θ2 is 5 degrees or more. More preferably, θ2 satisfies the following condition. θ1−15 degrees<θ2<θ1+10 degrees, wherein the axial thrust force of the stator 12 is maintained and the torque ratio is enlarged.

The impeller-side surface 28b of the stator blade 28 of the stator 12 is constituted by two or more line segments or a curved line so as to be convex toward the impeller. Consequently, the axial thrust force of the stator 12 is maintained and the torque ratio is enlarged.

Radius R1 of the impeller flow inlet 10a is shorter than radius R2 of the turbine flow outlet 11a, wherein radius R1 of the impeller flow inlet 10a is defined as a distance in the radial direction between a radially inner end (the most inner edge in the radial direction of the impeller flow inlet 10a) of the impeller blade 16 and the O-O axis as the rotational axis of the torque converter 1. Radius R2 of the turbine flow outlet 11a is defined as a distance in the radial direction between a radially inner end (the most inner edge in the radial direction of the turbine flow outlet 11a) of the turbine blade 21 and the rotational axis.

Accordingly, the capacity in the high speed ratio range in the torque converter 1 is restrained from decreasing because distance R1 between the most inner edge in the radial direction of the impeller blade 16 of the impeller 10 and the center is shorter than distance R2 between the most inner edge in the radial direction of the turbine blade 21 of the turbine 11 and the center. The design of setting lengths of the shells and the cores from the inlet to the outlet of the impeller 10 longer than those of the turbine 11 also contributes to the restraint on the decrease in the capacity.

(3) Operation

Next, the operation of the torque converter will be described.

The torque of the engine is transmitted from the crankshaft to the front cover 2 via a flexible plate, which drives the impeller 10 to cause the operating fluid to flow to rotate the turbine 11. The torque of turbine 11 is output to the main drive shaft of the transmission via the damper mechanism 42.

When the velocity ratio of the torque converter 1 increases and the main drive shaft reaches a certain speed, the operating oil in the space between the front cover 2 and the piston 41 is discharged through the first port 66. As a result, the turbine 11 and the piston 41 are moved toward the front cover 2, and the friction facing 46 is pressed against the friction surface 70 of the front cover 2. As a result, the torque of the front cover 2 is mechanically transmitted from the piston 41 to the damper mechanism 42. The torque is further transmitted from the damper mechanism 42 to the main drive shaft.

(4) Other Embodiment

The invention is not restricted to the foregoing embodiment, and various modifications and variations can be effected without departing from the spirit and scope of the invention.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A torque converter for transmitting torque from an engine to an input shaft of the transmission, comprising:
   a front cover being configured to receive torque from the engine;
   an impeller being fixed to said front cover defining a fluid chamber therewith;
   a turbine being located within said fluid chamber opposing said impeller;
   a stator being located between a radially inner portion of said impeller and a radially inner portion of said turbine to adjust a fluid flowing from said turbine to said impeller;
   a lock-up device being configured to transmit mechanically torque from said front cover to the input shaft and including an elastic member; and
   a torus being constituted by the impeller, the turbine and the stator, said torus having a radial dimension being longer than an axial dimension thereof, and a longitudinal axis thereof being inclined away from a straight line perpendicular to a rotational axis, a radially outer portion of the longitudinal axis being nearer to the engine than a radially inner portion thereof, and
   said elastic member being located adjacent on the front cover side of a radially inner portion of said torus.

2. The torque converter according to claim 1, wherein an inclined angle θ1 between the straight line and a line perpendicular to a line segment that realizes the shortest width passing through the center of said torus is within a range between 15 and 40 degrees.

3. The torque converter according to claim 2, wherein blades of said stator extend along the longitudinal axis.

4. The torque converter according to claim 3, wherein a surface of said blade of said stator facing said turbine is inclined away from the straight line such that a radially outer portion of said surface is nearer to the engine than a radially inner portion thereof.

5. The torque converter according to claim 2, wherein blades of said stator extend along the longitudinal axis, and
  a surface of said blade of said stator facing said turbine is inclined away from the straight line such that a radially outer portion of said surface is nearer to the engine than a radially inner portion thereof,
  said surface of said blade of said stator facing said turbine is straight in a cross sectional view,
  an angle θ2 between said surface facing said turbine and said line segment is more than or equal to 5 degrees, wherein θ1−15 degrees<θ2<θ1+10 degrees.

6. The torque converter according to claim 5, wherein a surface of said blade of said stator facing said impeller is composed of more than or equal to two line segments or a curved line convex to said impeller.

7. The torque converter according to claim 5, wherein a distance between the most radially inner edge of said blades of said impeller and the center of the torque converter is shorter than a distance between the most radially inner edge of said blades of said turbine and the center of said torque converter.

8. The torque converter according to claim 4, wherein a surface of said blade of said stator facing said impeller is composed of more than or equal to two line segments or a curved line convex to said impeller.

9. The torque converter according to claim 8, wherein a distance between the most radially inner edge of said blades of said impeller and the center of the torque converter is shorter than a distance between the most radially inner edge of said blades of said turbine and the center of said torque converter.

10. The torque converter according to claim 2, wherein a surface of said blade of said stator facing said turbine is inclined away from the straight line such that a radially outer portion of said surface is nearer to the engine than a radially inner portion thereof.

11. The torque converter according to claim 10, wherein a surface of said blade of said stator facing said impeller is composed of more than or equal to two line segments or a curved line convex to said impeller.

12. The torque converter according to claim 2, wherein a distance between the most radially inner edge of said blades of said impeller and the center of the torque converter is shorter than a distance between the most radially inner edge of said blades of said turbine and the center of said torque converter.

13. The torque converter according to claim 1, wherein blades of said stator extend along the longitudinal axis.

14. The torque converter according to claim 13, wherein a surface of said blade of said stator facing said turbine is inclined away from the straight line such that a radially outer portion of said surface is nearer to the engine than a radially inner portion thereof.

15. The torque converter according to claim 14, wherein a surface of said blade of said stator facing said impeller is composed of more than or equal to two line segments or a curved line convex to said impeller.

16. The torque converter according to claim 13, wherein a distance between the most radially inner edge of said blades of said impeller and the center of the torque converter is shorter than a distance between the most radially inner edge of said blades of said turbine and the center of said torque converter.

17. The torque converter according to claim 1, wherein a surface of said blade of said stator facing said turbine is inclined away from the straight line such that a radially outer portion of said surface is nearer to the engine than a radially inner portion thereof.

18. The torque converter according to claim 17, wherein a surface of said blade of said stator facing said impeller is composed of more than or equal to two line segments or a curved line convex to said impeller.

19. The torque converter according to claim 17, wherein a distance between the most radially inner edge of said blades of said impeller and the center of the torque converter is shorter than a distance between the most radially inner edge of said blades of said turbine and the center of said torque converter.

20. The torque converter according to claim 1, wherein a distance between the most radially inner edge of said blades of said impeller and the center of the torque converter is shorter than a distance between the most radially inner edge of said blades of said turbine and the center of said torque converter.

* * * * *